United States Patent [19]
Ekstedt

[11] 3,793,827
[45] Feb. 26, 1974

[54] STIFFENER FOR COMBUSTOR LINER

[75] Inventor: Edward E. Ekstedt, Cincinnati, Ohio

[73] Assignee: General Electric Company, Cincinnati, Ohio

[22] Filed: Nov. 2, 1972

[21] Appl. No.: 303,197

[52] U.S. Cl. .............................. 60/39.65, 60/39.66
[51] Int. Cl. .............................................. F02c 3/00
[58] Field of Search ......................... 60/39.65, 39.66

[56] References Cited
UNITED STATES PATENTS

| | | | |
|---|---|---|---|
| 3,307,354 | 3/1967 | Macaulay et al. ................. | 60/39.66 |
| 3,359,724 | 12/1967 | Barnwell et al. .................... | 60/39.65 |
| 3,064,425 | 11/1962 | Hayes ............................ | 60/39.66 X |
| 3,038,309 | 6/1962 | Waters ............................... | 60/39.66 |
| 3,138,930 | 6/1964 | Waters et al. ................... | 60/39.69 X |

Primary Examiner—Carlton R. Croyle
Assistant Examiner—Robert E. Garrett
Attorney, Agent, or Firm—James M. Kipling; Derek P. Lawrence

[57] ABSTRACT

A combustor liner in a gas turbine engine is provided with a stiffener for disposition within a cooling fluid plenum circumscribing the liner. The stiffener engages and adds radial and circumferential stiffness to the liner. The stiffener includes a fluid inlet opening into the plenum for admitting a portion of the cooling fluid from the plenum, a reduced flow area portion wherein the fluid is accelerated and brought into heat exchanging engagement with the liner, and an outlet for exhausting the fluid. In one form, the outlet directs the cooling fluid through an aperture in the liner and into the combustion zone for the purpose of film-cooling a portion of the liner downstream from the aperture.

12 Claims, 5 Drawing Figures

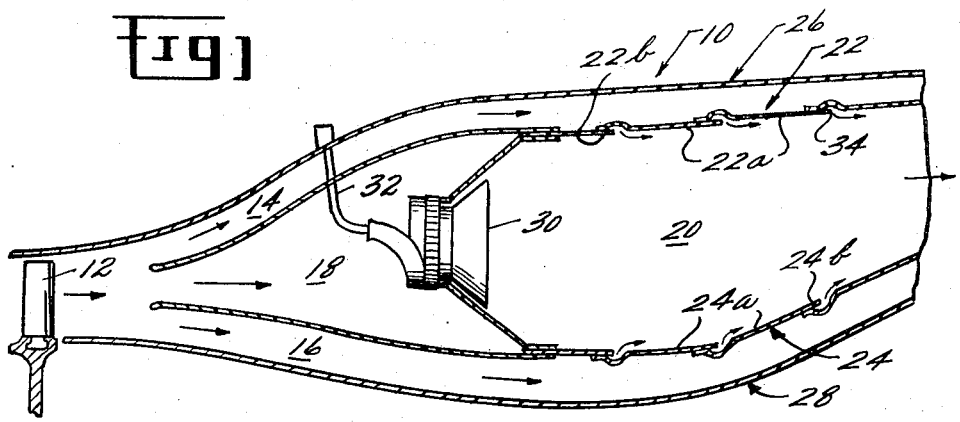
Fig 1
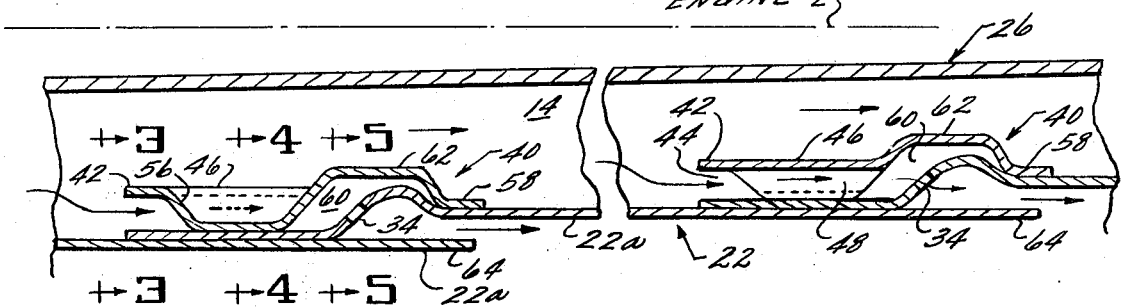
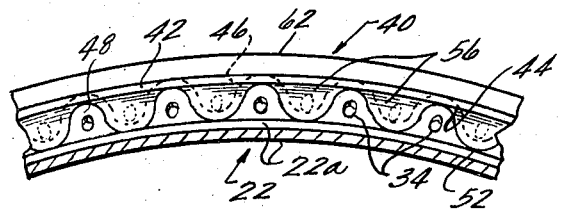
Fig 2
Fig 3
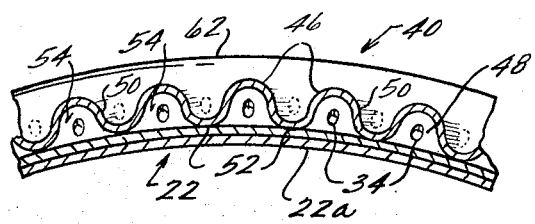
Fig 4
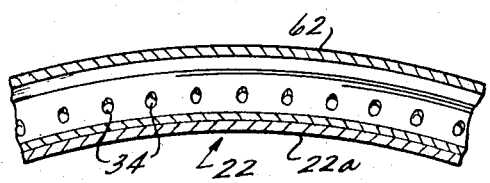
Fig 5

STIFFENER FOR COMBUSTOR LINER

BACKGROUND OF THE INVENTION

This invention relates to devices for adding strength to combustor liners and gas turbine engines, and more particularly to stiffeners enhancing liner cooling.

In the design of gas turbine engine combustors, liners defining the combustion zone must be light enough in weight to permit the aircraft variety of these engines to successfully fly. The liner, however, must also withstand terrific aerodynamic forces and stresses resulting from the rapid expansion of the oxidizing gases within the combustion zone. Furthermore, in order to provide sufficient cooling to prevent heat damage to combustor liners, the liner is commonly surrounded by a plenum for cooling fluid which is maintained at a higher local pressure than the pressure within the combustion zone proximate the liner. Hence, a pressure drop is created across the liner resulting in substantial buckling forces in addition to the aerodynamic stresses already extant.

These combined design characteristics require that the combustor liner be formed of a thin and lightweight yet strong material, fabricated in a manner which provides substantial rigidity or stiffness in both the radial and circumferential directions. One form of combustion liner which has operated successfully under these limitations is a liner formed of a plurality of telescoping, overlapping annular rings wherein each ring engages the adjacent upstream ring in a substantially circular joint in order to define the combustion zone. Liners of this variety have performed successfully in the past. However, requirements of increased life and reliability have led to the imposition of liner stiffeners of various forms to add radial and circumferential rigidity.

A contemporaneous problem has been that ever increasing nominal combustion temperatures within a combustion zone result in a requirement for increasing cooling efficiency without increasing overall application of cooling fluid. (The quantity of cooling fluid applied to various portions of gas turbine engines is inversely proportional to the overall engine efficiency, hence, methods for reducing quantities of cooling fluid used while increasing cooling efficiency are particularly important.)

Combustor liner cooling must counteract the heat transferred to the liner by convection and radiation from the hot combustion products in the combustion zone. In the past, convective heating of the liner has been reduced by maintaining a low boundary temperature through the addition of films of cooling fluid to the heated side of the liner. For this purpose, combustor liners surrounded by cooling fluid plena have been supplied with apertures at appropriate positions for providing communication between liner side and the cooling fluid plenum. The apertures have been formed in a manner to facilitate the formation of a cooling fluid film on the heated liner side.

To supplement film cooling of a liner, a circumscribing cooling fluid plenum is arranged so that the fluid therein removes heat from the liner by means of convective heat transfer. This variety of heat transfer is a function of the velocity of cooling fluid which engages the liner. Hence, it is desirable that the fluid velocity within the plenum which engages the liner be relatively large. Unfortunately, high plenum fluid velocities result in large pressure loss creating overall inefficiencies. Furthermore, high fluid velocities within the plenum also affect detrimentally the uniformity of desirable temperature profile within a combustion zone adversely affecting combustion efficiency. For these and other reasons, it has been found unsatisfactory to provide large cooling fluid velocities throughout the plenum.

The present invention overcomes the foregoing limitations by providing a combustor stiffener which increases combustor rigidity for the purpose of increasing combustor life and reliability and which contemporaneously performs a valuable cooling function by means of diverting a portion of the cooling fluid within the plenum and accelerating this portion of the fluid while bringing it into engagement with the combustor liner. The overall effect of this latter characteristic is the increased convective cooling efficiency of the cooling fluid with respect to the combustor liner without the necessity of increasing the overall fluid velocity within the plenum.

BRIEF SUMMARY OF THE INVENTION

It is therefore a primary object of the present invention to provide a stiffening member for combustor liners in gas turbine engines which member does not add undesirably large weight increases to the liner.

It is a further object of the present invention to provide a combustor liner stiffener which also serves to effectively increase cooling efficiency with respect to the liner.

These and other objects which will become apparent hereinafter are accomplished by the present invention which, in one form thereof, provides a liner stiffener which substantially circumscribes the combustor liner and provides means for reinforcing the liner which means may take the form of a substantially circular joint around the liner where the liner thickness is substantially doubled. The reinforcing means cooperates with a substantial circumferential portion of the liner for the purpose of adding radial and circumferential stiffness thereto. In addition, the stiffener includes a fluid inlet, opening into the plenum, for diverting a portion of the cooling fluid from the plenum and a flow area reducing member for increasing the velocity of the cooling fluid proximate the liner for the purpose of increasing convective heat transfer therebetween. Furthermore, the liner includes an enclosure which substantially circumscribes the liner and overlies a liner aperture (through which the film fluid enters the combustion zone) for the purpose of directing cooling fluid exiting the flow area reducing member through the aperture to form a cooling film on the heated side of the liner.

BRIEF DESCRIPTION OF THE DRAWING

The concepts of the present invention will be further elucidated by the appended description when taken in conjunction with the drawing wherein:

FIG. 1 is a section view of a common combustor including a combustor liner;

FIG. 2 is an enlarged view of a portion of a combustor similar to that in FIG. 1 to which a liner stiffener according to the present invention has been added;

FIG. 3 is a section view of the combustor liner and stiffener according to the present invention taken along line 3—3 of FIG. 2;

FIG. 4 is a section view taken along line 4—4 of FIG. 2; and

FIG. 5 is a section view taken along line 5—5 of FIG. 2.

DETAILED DESCRIPTION OF A PREFERRED EMBODIMENT

While the concepts of the present invention are amenable to considerable adaptation, the following is a preferred embodiment thereof.

FIG. 1 depicts a common combustor liner of the variety which forms a portion of present gas turbine engines. The combustor is generally designated 10 and is shown to be positioned downstream from a high pressure compressor stage 12 which supplies compressed air to cooling air plena 14 and 16 as well as to a primary air inlet 18. Combustion zone 20 is defined by combustor liners 22 and 24. Plenum 14 is defined by liner 22 in combination with an outer liner 26; while plenum 16 is defined by liner 24 along with an outer liner 28. At the upstream end of the combustion zone 20 is disposed a fuel carbureting device 30 which mixes fuel provided by fuel line 32 with primary air entering through inlet 18. The combustor 10 operates in the conventional manner wherein a mixture of fuel and primary air exiting carburetor 30 is ignited and oxidized or burned within combustion zone 20, the products of combustion rapidly expanding and exiting to the right in FIG. 1 providing a thrust to the left.

Combustor liners 22 and 24 may be seen in FIG. 1 to comprise telescoping, overlapping annular rings 22a and 24a with each respective ring engaging the adjacent upstream or leftward ring in circular joints 22b and 24b. This combustor configuration has proven substantially satisfactory in present applications in withstanding the great aerodynamic forces imposed upon the liner by burning gases within combustor space 20 as well as the substantial pressure differential between plena 14 and 16 and combustion zone 20 imposed across liners 22 and 24. However, for the purpose of increasing the life and reliability of the combustor liners, the present invention provides additional lightweight stiffening members which also serve to increase cooling efficiency.

Cooling is accomplished in FIG. 1 in part by the passing of cooling air from each plenum in a film across the heated side of the combustor liner associated therewith. For example, liner 22 is provided with apertures 34 located near each circular joint between adjacent rings 22a. These apertures facilitate the flowing of the cooling air in a film upon the heated side of the combustor liner 22. As has been stated hereinabove, additional cooling of the liners is accomplished by convective heat transfer between the cooling air within the plena and the outward surfaces of the liners.

The present invention provides means for stiffening combustor liners in a lighweight fashion in addition to enhancing the cooling efficiency of the overall combustor configuration. FIGS. 2 through 5 illustrate one embodiment of the present invention as applied to combustor liner 22 of FIG. 1. In FIG. 2, stiffeners generally designated 40 according to the present invention are shown to be added to liner 22 at points near the junction between adjacent annular rings 22a. FIGS. 3 through 5 show axial, cross-sectional views of the liner stiffener of the present invention in cooperation with liner 22 taken along various axial sections. These figures will be described and discussed conjunctively.

Briefly summarizing, the combustor liner stiffener 40 includes an inlet means for diverting a portion of the cooling fluid from the plenum 14; an outlet means for exhausting that same portion of the cooling fluid from the stiffener; flow area reducing means disposed proximate the liner 22 and interconnecting the inlet and outlet means for increasing fluid flow velocity (in a manner to be described hereinafter) in order to increase convective heat transfer between the fluid and the liner; and reinforcing means for cooperating with a substantial circumferential portion of the liner for the purpose of adding radial and circumferential stiffness.

In the embodiment depicted in FIGS. 2 through 5, the inlet takes the form of an annular ring 42 spaced from the liner 22 and forming an orifice 44 into which a portion of the cooling fluid from plenum 14 is directed. The flow area reducing means incorporates a wall 46 spaced from the liner and defining a passage 48 within the plenum extending downstream of orifice 44, a portion of passage 48 being closed to fluid flow such that the entire flow is directed toward the open passage portion and, as a result, is increased in velocity. More particularly, wall 46 is, in this embodiment, a corrugated wall having its corrugations axially aligned with respect to the combustor liner 22 and having a first plurality of corrugations 50 open toward and facing liner 22, while a second plurality of corrugations 52 open toward and face the plenum 14 associated therewith. The liner-facing corrugations 50 define a plurality of individual conduits 54 adajcent the liner 22. The plenum-facing corrugations 52 cooperate with liner 22 at circumferential intervals in order to form a portion of the reinforcing means (as described hereinafter). By virtue of a diagonal portion 56 of the wall 46 extending between the annular ring 42 and liner 22, the plenum-facing corrugations 52 are closed to fluid flow, with the result that the entire quantity of fluid flow entering orifice 44 is forced to traverse the flow reducing means by way of the individual conduits 54 formed by the liner and liner-facing corrugations 50 such that the total flow area is approximately halved (the total area of conduits 54 being approximately half the total flow area of orifice 44). Since the liner-facing corrugations and their conduits 54 are bounded by combustor liner 22, the fluid directed into conduit 54 is brought into intimate convective heat exchange relationship with the liner 22. Since the fluid is increased in velocity due to the reduction of flow area, such convective heat exchange is substantially increased between the fluid and liner 22 within conduits 54, as compared with unaccelerated flow.

As stated above, the reinforcing means of the combustor liner stiffener 40 includes the circumferential plurality of points of cooperation between the plenum-facing corrugations 52 and the liner. Additionally, the stiffener has an axially extending rim 58 which is brazed to or otherwise cooperates with liner 22. Rim 58 provides a substantially circumferential joint where the liner thickness is effectively doubled for substantial added circumferential and radial stiffness.

As depicted in FIGS. 2 through 5, the liner 22 bears a plurality of apertures 34 which provide communication between plenum 14 and the combustion zone 20 for the purpose of forming a protective film of cooling fluid upon the radially inward and heated side of liner 22. The apertures 34 are spaced in circumferential rows and are arranged axially according to optimum cooling fluid dispersion. When used with a liner of this variety, the outlet means of the stiffener of the present invention incorporates means for directing cooling fluid through these apertures 34. In the present embodiment, the stiffener forms an enclosure 60 proximate and substantially circumscribing the plenum side of a row of apertures 34. The enclosure 60 is substantially annular and is disposed substantially circumscribing the liner and opening aft into the aperture 34 and further opening forward into the conduits 54 formed by the liner-facing corrugations. The enclosure is defined by a contoured portion 62 of the wall 46, in cooperation with liner 22.

Stiffeners conforming to the present invention which are used in combination with other forms of liners may be provided with outlet means which return the cooling fluid to the plenum 14 rather than directing the fluid through apertures into the combustion zone. Such stiffeners would provide improved convective cooling of the associated liner and stiffen the liner in the same fashion as the presently described stiffener.

The operation of the combustor stiffener 40 of the present invention will now be described. Atmospheric air is pressurized by a compressor including compressor stage 12 from which the pressurized air is directed into the plena 14 and 16 as well as the primary air inlet 18. The primary air is mixed with fuel by carburetor 30 and burned within combustion zone 20 as described above. The cooling air within plenum 14 is directed across portions of liner 22 in order to remove heat therefrom by convective heat flow. As discussed above, the velocity of air within the plenum 14 is, of necessity, small in order to minimize friction losses and structural stresses. Nevertheless, due to the large aerodynamic stresses imposed upon the liner 22 by the expansion of the burning fluid within the combustion zone 20, in addition to the buckling forces resulting from the pressure differential across liner 22, the liner is subjected to substantial stress which may be advantageously alleviated by means of the addition of stiffeners 40.

Radial and circumferential rigidity are added to the liner 22 by stiffeners 40 and particularly by the circumferential rim 58 in its cooperation with liner 22, as well as by the circumferentially spaced points of cooperation between corrugated wall 46 and liner 22. These reinforcements serve to support the liner against the aforementioned aerodynamic and pressure-related forces and stresses.

In order to enhance the cooling of liner 22 by convective heat transfer to the cooling air within plenum 14, the stiffeners according to the present invention divert a portion of the cooling air by means of orifice 44 created by annular ring 42. Air thus diverted is directed axially with respect to the stiffener and into engagement with diagonal wall portion 56 which effectively directs the air into the adjacent individual conduits 54. As mentioned above, the total flow area of the conduits 54 is substantially less (approximately one-half) than the total flow area of orifice 44. As a result, the velocity of the cooling air within conduits 54 is of necessity substantially higher (approximately double) the velocity of the air within plenum 14. Furthermore, since conduits 54 are partially defined by liner 22, the cooling air passing through conduits 54 is brought into intimate heat exchange relationship with liner 22. In this fashion, the convective cooling of liner 22 may be substantially improved by use of the stiffeners of the present invention.

Furthermore, the stiffeners of the present invention may be disposed in locations and configurations appropriate to bring added heat transfer capabilities to portions of combustor liners undergoing chronic heat concentrations. Also, owing to the substantially circular contour of the plenum-facing corrugations 52, their cooperation with liner 22 is of necessity limited to a single linear engagement so that the cooling air directed to conduits 54 engages and cools substantially the entire circumference of the liner. In this way, heat concentrations resulting from the cooperation of wall 46 and liner 22 can be minimized.

Upon traversing conduits 54, the cooling air is exhausted therefrom into enclosure 60. From this point, the air is directed through apertures 34 and into combustion zone 20. The apertures 34 along with the overhangs 64 are adapted to distribute the cooling air from enclosure 60 across the radial inner and heated side of liner 22 in a cooling film in order to insulate the liner from the direct contact of the products of combustion.

While the present invention has been described particularly with respect to one embodiment thereof, those skilled in the art may readily vary the particular configuration disclosed here and without departing from the concepts of the present invention. For example, while the corrugated wall configuration 46 disclosed serves to perform the functions of decreasing flow area while directing cooling air over substantially the entire circumference of liner 22 (decreased only by the linear points of contact between the corrugations and liner), it may be seen that walls having other configurations may serve these purposes with equal facility. For example, a wall having a plurality of adjacent, diagonal portions in the cross section would serve equally as well. Also, as has been stated, the application of the stiffener disclosed is not dependent upon the presence of apertures 34, and such a stiffener could perform functions of stiffening and locally cooling a liner, and returning the cooling air to the plenum rather than passing it into the combustion zone. Furthermore, the length and dispositions of the corrugations of the present stiffener are determined by reference to cooling requisites, and can be varied substantially in given applications. In view of the breadth of the concepts disclosed herein, it is contemplated that the appended claims include all such variations as may occur to one skilled in the art.

What is considered to be new and desired to be secured by Letters Patent of the United States is:

I claim:

1. A combustor stiffener disposed within a cooling fluid plenum cooperating with a heated combustor liner in a gas turbine engine, wherein the liner defines a combustion zone, the stiffener comprising:
   inlet means for diverting a portion of cooling fluid from the plenum;
   outlet means for exhausting the portion of cooling fluid from the stiffener;
   flow area reducing means disposed proximate the liner and interconnecting the inlet means and the outlet means for increasing flow velocity of the portion of the cooling fluid passing between the inlet means and the outlet means, whereby convective heat transfer between the fluid and the liner is increased;

reinforcing means for cooperating with a substantial circumferential portion of the liner for the purpose of adding structural stiffness thereto; the flow area reducing means comprises a wall spaced from the liner and defining a passage within the plenum, the wall extending downstream of the inlet means and having preselected portions of the passage thereof closed to fluid flow, whereby the entire fluid flow is directed through the remaining open passage portions such that the flow area of said passage is reduced, causing increased flow velocity; the passage defining wall is a substantially corrugated wall having preselected corrugations closed to fluid flow.

2. The combustor stiffener of claim 1 wherein:

the corrugated wall is aligned axially of the liner, adjacent of the corrugations facing respectively the liner and the plenum, and wherein preselected of the plenum-facing corrugations are said closed corrugations.

3. The combustor stiffener of claim 2 wherein:

preselected of the plenum-facing corrugations cooperate with the liner, and preselected liner-facing corrugations combine with the liner to form individual conduits for fluid flow, whereby the fluid is directed into intimate heat-exchanging cooperation with the liner.

4. The combustor stiffener of claim 3 wherein:

the reinforcing means includes the preselected plenum-facing corrugations which cooperate with the liner.

5. The combustor stiffener of claim 4 wherein:

the inlet means includes a substantially annular ring spaced radially apart from the liner and which combines with the liner to form an orifice in the plenum.

6. The combustor stiffener of claim 5 wherein:

the reinforcing means further includes a circumferential joint substantially circumscribing the liner.

7. A combustor stiffener disposed within a cooling fluid plenum cooperating with a combustor liner in a gas turbine engine, wherein the liner bears an aperture for providing communication between the plenum and a combustion zone defined by the liner, the stiffener comprising:

directing means disposed proximate the aperture for directing a portion of the cooling fluid through the aperture;

inlet means opening into the plenum for diverting a portion of the cooling fluid into cooperation with the directing means;

flow area reducing means disposed proximate the liner and cooperating with the inlet means and the directing means for increasing flow velocity of the portion of the cooling fluid passing from the inlet means to the directing means, whereby convective heat transfer between the liner and the fluid is increased;

engaging means for engaging the liner and adding stiffness thereto; the flow area reducing means comprises a wall spaced from the liner and defining a passage within the plenum, the wall extending downstream of the inlet means and having preselected portions of the passage thereof closed to fluid flow, whereby the entire fluid flow is directed through the remaining open passage portions such that the flow area of said passage is reduced, causing increased flow velocity; the passage defining wall is a substantially corrugated wall having preselected corrugations closed to fluid flow.

8. The stiffener of claim 7 wherein:

the corrugated wall is aligned axially of the liner, adjacent of the corrugations facing respectively the liner and the plenum, and wherein preselected of the plenum-facing corrugations are said closed corrugations.

9. The stiffener of claim 8 wherein:

preselected of the plenum-facing corrugations cooperate with the liner, and preselected liner-facing corrugations combine with the liner to form individual conduits for fluid flow, whereby the fluid is directed into intimate heat-exchanging cooperation with the liner.

10. The stiffener of claim 9 wherein:

the reinforcing means includes the preselected plenum-facing corrugations which cooperate with the liner.

11. The stiffener of claim 10 wherein:

the inlet means includes a substantially annular ring spaced radially apart from the liner and which combines with the liner to form an orifice in the plenum.

12. The stiffener of claim 11 wherein:

said directing means includes a substantially annular enclosure substantially circumscribing the liner and opening into said aperture and further opening into said conduits.

* * * * *